United States Patent
Payne

(10) Patent No.: US 9,341,392 B2
(45) Date of Patent: May 17, 2016

(54) SOLAR RECEIVER PANEL AND SUPPORT STRUCTURE

(71) Applicant: ALSTOM Technology Ltd., Baden (CH)

(72) Inventor: Ronald G. Payne, West Simsbury, CT (US)

(73) Assignee: ALSTOM Technology Ltd., Baden (CH)

( * ) Notice: Subject to any disclaimer, the term of this patent is extended or adjusted under 35 U.S.C. 154(b) by 236 days.

(21) Appl. No.: 13/675,153

(22) Filed: Nov. 13, 2012

(65) Prior Publication Data
US 2014/0130793 A1  May 15, 2014

(51) Int. Cl.
| | |
|---|---|
| *F24J 2/42* | (2006.01) |
| *F24J 2/46* | (2006.01) |
| *F24J 2/07* | (2006.01) |
| *F24J 2/24* | (2006.01) |
| *B21D 53/02* | (2006.01) |

(52) U.S. Cl.
CPC ............... *F24J 2/4647* (2013.01); *B21D 53/02* (2013.01); *F24J 2/07* (2013.01); *F24J 2/245* (2013.01); *Y02E 10/41* (2013.01); *Y02E 10/44* (2013.01); *Y10T 29/49355* (2015.01)

(58) Field of Classification Search
USPC ...................................... 126/663; 29/890.033
See application file for complete search history.

(56) References Cited

U.S. PATENT DOCUMENTS

| | | | |
|---|---|---|---|
| 3,285,504 A | 1/1967 | Engler | |
| 3,375,628 A | 4/1968 | Connell et al. | |
| 4,285,335 A * | 8/1981 | Simmons et al. | 126/660 |
| 4,384,550 A * | 5/1983 | Miller | 122/510 |
| 4,412,510 A | 11/1983 | Perry et al. | |
| 4,512,336 A | 4/1985 | Wiener | |
| 5,482,233 A | 1/1996 | Marko et al. | |
| 5,862,800 A | 1/1999 | Marko | |
| 2010/0101564 A1 | 4/2010 | Iannacchione et al. | |
| 2010/0199977 A1 | 8/2010 | Plotkin et al. | |
| 2010/0199980 A1 | 8/2010 | Ricci et al. | |

FOREIGN PATENT DOCUMENTS

EP   0106688   4/1984

OTHER PUBLICATIONS

Office action issued from Egyptian Patent Office dated Nov. 30, 2015 for EG Application No. 1702/2013.

* cited by examiner

*Primary Examiner* — Avinash Savani
(74) *Attorney, Agent, or Firm* — Dority & Manning, P.A.

(57) ABSTRACT

In a solar receiver arrangement 300 with a support structure 600, the support structure 600 includes a plurality of tie members 700 for tangentially coupling a plurality of tubes 510, for forming at least one receiver panel 500, in such a manner that the at least one tie member 700 is coupled in at least one crotch portion 520 between a pair of tubes 510. The support structure 600 further includes a plurality of panel support members 800 coupled to the receiver panel 500 selectively in at least one crotch portion 520 between a pair of tubes 510. Furthermore, at least one latching member 900 is configured to detachably attach the plurality of panel support members 800 for engaging the plurality of receiver panels 500.

10 Claims, 4 Drawing Sheets

SOLAR RECEIVER PANEL AND SUPPORT STRUCTURE

BACKGROUND

1. Field of Endeavor

The present disclosure relates to solar power plants, and, more particularly, to a solar receiver arrangement and a support structure.

2. Brief Description of the Related Art

A concentrated solar power plant use a solar receiver steam generator located at an elevation of a support tower, where the solar rays are focused for utilizing the solar heat to produce electricity.

Solar receiver steam generators generally include various fluid carrying tubes that are heated by focusing sunrays thereon, in turn heating fluid to be utilized for producing electricity. Grouping and arrangement of tubes and support elements for supporting such grouped and arranged tubes are quite important and critical from the point of view of effectively utilizing heat flux of the sunrays without failure.

For examples, if the support element designs restrict a substantial amount of heat flux, the fluid heating may be affected. Further, if the supporting elements utilize a greater number of components in order to support or attach individual tube or grouped tubes, the chances of developing high local stress at or around attachment regions are high. Furthermore, a greater number of components in the support element, depending upon the grouping and arrangement of the tubes, would be unmanageable from the view of assembly and maintenance.

While previously known support and tube arrangements may have generally been considered satisfactory for their intended purposes, there has remained a need in the art for solar receivers that can improve tube and support arrangements to make it substantially more manageable in terms of assembly and maintenance, more exposure to heat flux, and reduction of local stress development.

SUMMARY

The present disclosure provides a solar receiver arrangement and a support structure that will be presented in the following simplified summary to provide a basic understanding of one or more aspects of the disclosure that are intended to overcome the discussed drawbacks, but to include all advantages thereof along with providing some additional advantages. This summary is not an extensive overview of the disclosure. It is intended to neither identify key or critical elements of the disclosure, nor to delineate the scope of the present disclosure. Rather, the sole purpose of this summary is to present some concepts of the disclosure, its objects and advantages in a simplified form as a prelude to the more detailed description that is presented hereinafter.

An object of the present disclosure is to describe a solar receiver arrangement and a support structure that may be substantially more manageable in terms of assemblage and maintenance, may ensure maximum exposure to heat flux, and reduces local stress development while connection thereof. A further object of the present disclosure to describe such a support structure, that is capable of particularly applicable for use in tying and supporting together the tubes of the solar receiver panels, wherein the tubes to be joined bear a tangential relationship to each other. Yet another object is to describe a solar receiver arrangement and a support structure that is capable of being fabricated and assembled with a relative ease. Still a further object of the present disclosure is to describe such solar receiver arrangement and support structure that is economical to produce and to employ. Various other objects and features of the present disclosure will be apparent from the following detailed description.

The above noted and other objects may be achieved by a support structure for a solar receiver arrangement and the solar receiver arrangement itself.

In one aspect of the present disclosure, the support structure for a solar receiver arrangement comprises: a plurality of tie members tangentially coupling a plurality of tubes, for configuring at least one receiver panel, in such a manner that at least one tie member is coupled in at least one crotch portion between a pair of tubes; a plurality of panel support members, at least one panel support member of the plurality of panel support members coupled to the receiver panel selectively in the at least one crotch portion between a pair of tubes; and at least one latching member configured to detachably attach the plurality of panel support members for engaging the plurality of receiver panels.

In one embodiment, each of the plurality of tie members are substantially short-length rods that are welded in the crotch portion between the pair of the tubes for coupling the pair of tubes by covering a substantially small region thereof to have maximum direct solar rays incident directly over the tubes. In a further embodiment, at least one tie member may be coupled in both the opposite crotch portions of the pair of tubes.

In another embodiment, each of the plurality of panel support members is coupled to at least one receiver panel selectively in the at least one crotch portion, lying substantially at a middle region of the plurality of receiver panels.

In yet another embodiment, the at least one latching member comprises a channel member to receive the plurality of panel support members to detachably attach thereto. In such an embodiment, each of the plurality of panel support members may be a longitudinally extending threaded rod that may be received in the channel for engaging the plurality of receiver panels.

In another aspect, the solar receiver arrangement comprises: a plurality of receiver panels arranged adjacent to one another, each panel having a plurality of tubes coupled tangentially to one another; a plurality of tie members coupling the plurality of tangentially arranged tubes in such a manner that at least one tie member is coupled in at least one crotch portion between a pair of tubes; and a plurality of panel support members, at least one panel support member of the plurality of panel support members coupled to at least one receiver panel selectively in the at least one crotch portion between a pair of tubes.

In one embodiment, the plurality of receiver panels may be arranged adjacent to one another, in at least one of a spaced apart configuration and a closely associated configuration.

In another embodiment, the solar receiver arrangement further comprises at least one latching member configured to detachably attach the plurality of panel support members for engaging the plurality of receiver panels. In a further embodiment, the at least one latching member comprises a channel member to receive the plurality of panel support members to detachably attach thereto. In such an embodiment, each of the plurality of panel support members include a longitudinally extending threaded rod that is received in the channel for engaging the plurality of receiver panels.

In another aspect, a solar receiver panel and a method for making are provided. The solar receiver panel comprises: a plurality of tubes tangential to one another; a plurality of tie members for coupling the plurality of tangentially arranged tubes in such a manner that at least one tie member is coupled in at least one crotch portion between a pair of tubes; and at least one panel support member coupled to the plurality of tubes selectively in the at least one crotch portion between a pair of tubes.

Further, the method for making a solar receiver panel comprises: arranging a plurality of tubes tangentially to one another; welding a plurality of tie members for coupling the plurality of tangential arranged tubes in such a manner that at least one tie member is welded in at least one crotch portion between a pair of tubes; and welding at least one panel support member to the plurality of tubes selectively in the at least one crotch portion between a pair of tubes.

These together with the other aspects of the present disclosure, along with the various features of novelty that characterize the present disclosure, are pointed out with particularity in the present disclosure. For a better understanding of the present disclosure, its operating advantages, and its uses, reference should be made to the accompanying drawings and descriptive matter in which there are illustrated exemplary embodiments of the present disclosure.

BRIEF DESCRIPTION OF THE DRAWINGS

The advantages and features of the present disclosure will better understood with reference to the following detailed description and claims taken in conjunction with the accompanying drawing, wherein like elements are identified with like symbols, and in which:

Like reference numerals refer to like parts throughout the description of several views of the drawings.

DETAILED DESCRIPTION OF EXEMPLARY EMBODIMENTS

For a thorough understanding of the present disclosure, reference is to be made to the following detailed description, including the appended claims, in connection with the above-described drawings. In the following description, for purposes of explanation, numerous specific details are set forth in order to provide a thorough understanding of the present disclosure. It will be apparent, however, to one skilled in the art that the present disclosure can be practiced without these specific details. In other instances, structures and devices are shown in block diagrams form only, in order to avoid obscuring the disclosure. Reference in this specification to "one embodiment," "an embodiment," "another embodiment," "various embodiments," means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but may not be of other embodiment's requirement.

Although the following description contains many specifics for the purposes of illustration, anyone skilled in the art will appreciate that many variations and/or alterations to these details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure. Further, the relative terms, such as "inner," "outer," "upper," "lower" and the like, herein do not denote any order, elevation or importance, but rather are used to distinguish one element over another. Further, the terms "a," "an," and "plurality" herein do not denote a limitation of quantity, but rather denote the presence of at least one of the referenced item.

Figure 1:
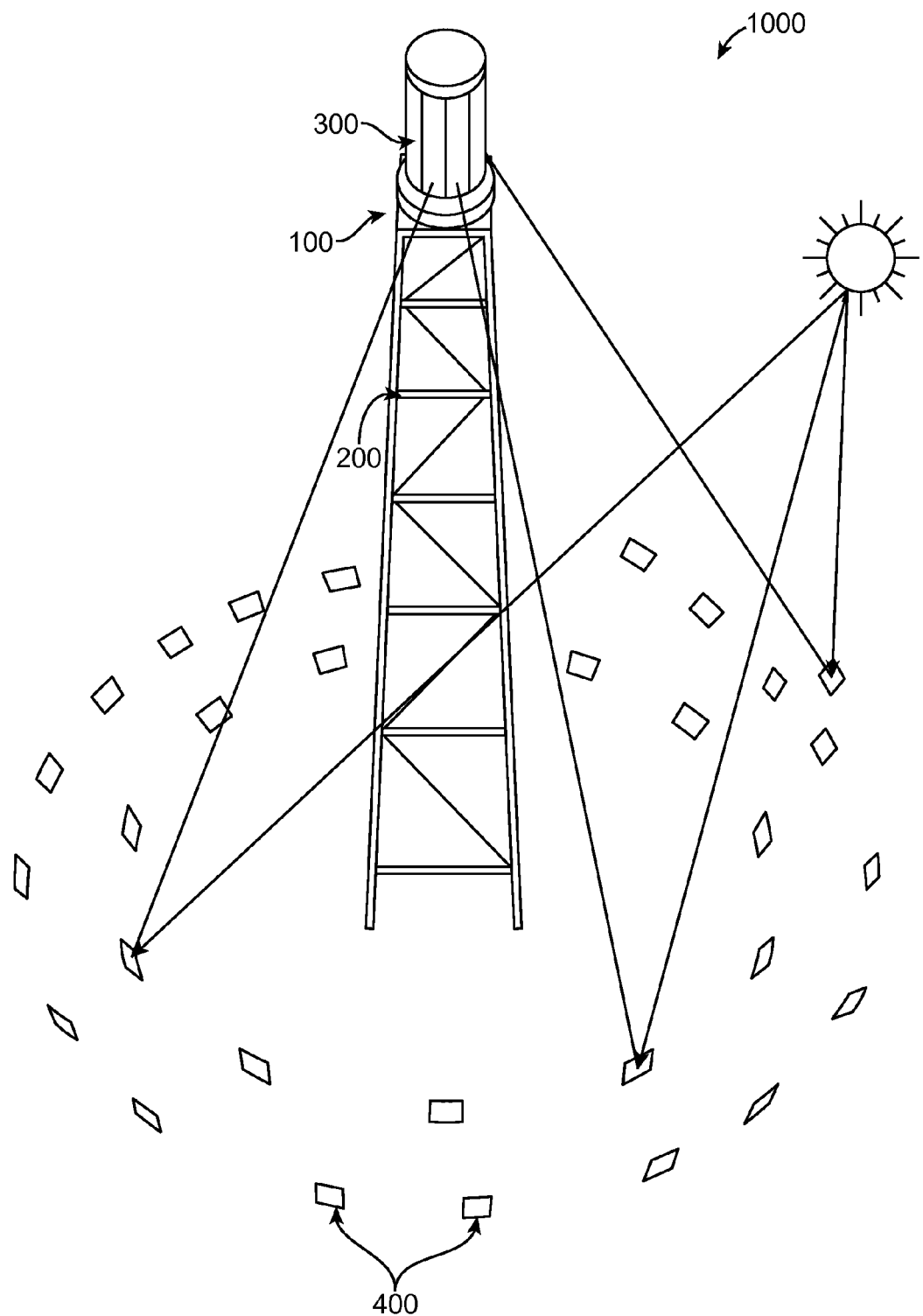
FIG. 1 illustrates a concentrated solar power plant set-up, in accordance with an exemplary embodiment of the present disclosure.
Figure 2:
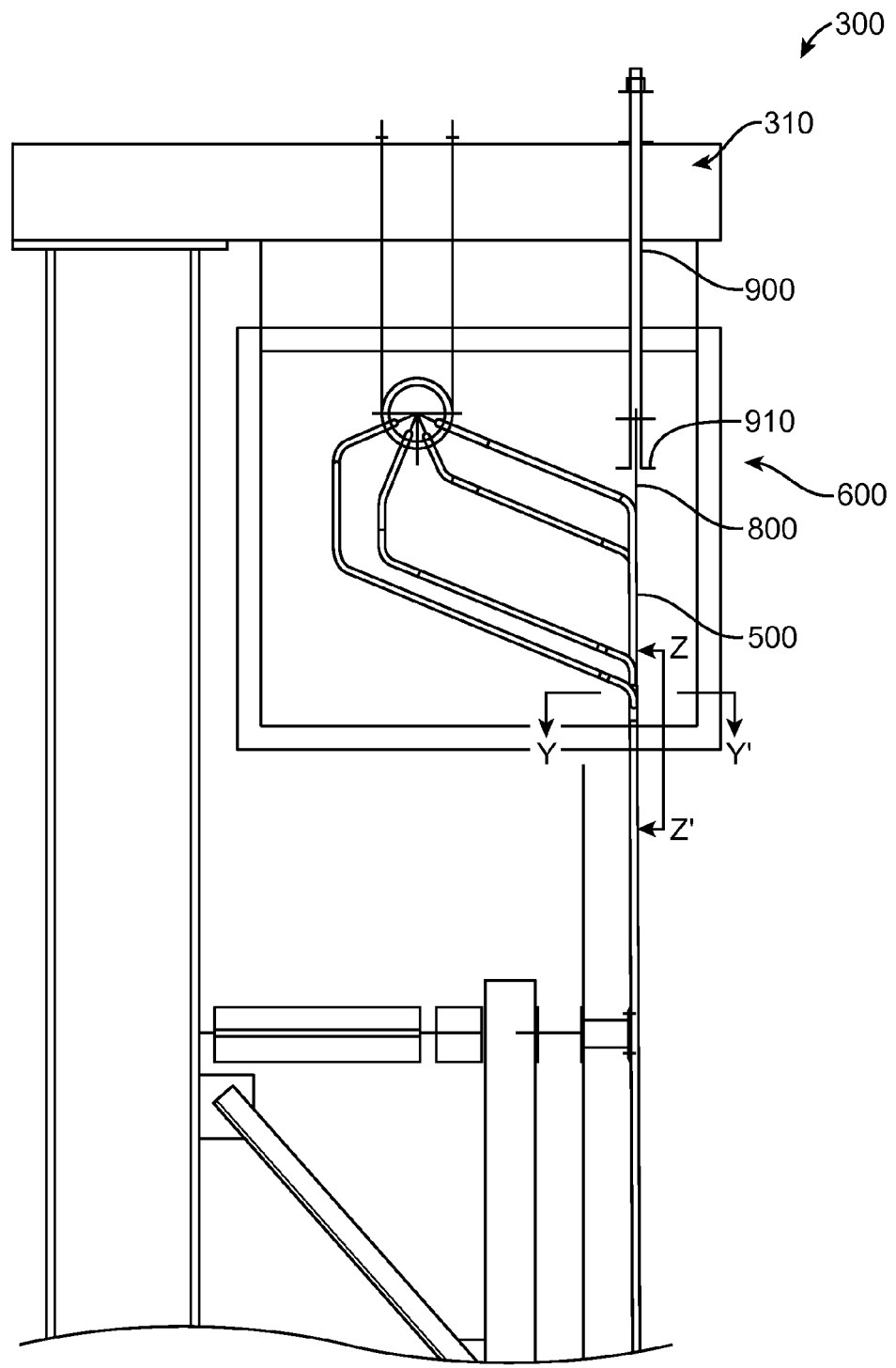
FIG. 2 illustrates a solar receiver tube and support arrangements, in accordance with an exemplary embodiment of the present disclosure.

Referring now to FIG. 1, an example of a solar power plant set-up 1000 is illustrated in accordance with an exemplary embodiment of the present disclosure. The solar power plant set-up 1000 includes a concentrated solar tower assembly 100 having a tower structure 200 and a solar receiver 300 placed at the top thereof, where solar rays are concentrated from a heliostat 400 for the production of electricity. Specifically, the solar receiver 300 includes various tubes or tube panels through which fluid flows for carrying the solar heat accumulated therein due to concentrated solar rays by the heliostat 400. In as much as the construction and arrangement of the solar power plant set-up 1000 having the tower 100, the solar receiver 300, and the heliostat 400 are all well-known to those skilled in the art, it is not deemed necessary for purposes of acquiring an understanding of the present disclosure, that there be recited herein all of the constructional details and explanation thereof. Rather, it is deemed sufficient to simply note that FIG. 2 illustrates a solar receiver tube and support arrangements that may be successfully utilized in relation to any solar receiver, such as the solar receiver 300, as known there, in accordance with an exemplary embodiment of the present disclosure. Further, it should be understood that the tower structure 200 and the solar receiver 300 may include a variety of components for performing their assigned purpose, and only those components are shown that are relevant for the description of various embodiments of the present disclosure.

Figure 3A:
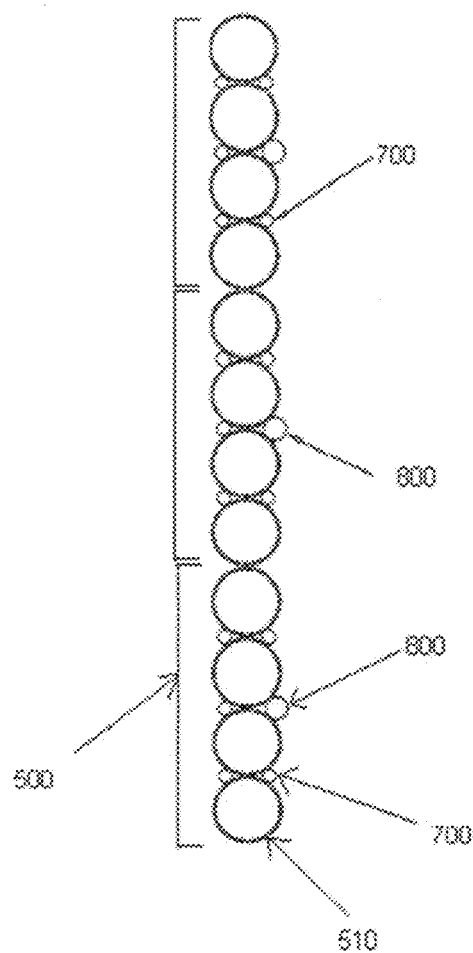
FIGS. 3A and 3B, respectively, illustrate cross-sectional top and side views of the solar receiver tube and support arrangements, along axis Y-Y' and axis Z-Z', in accordance with an exemplary embodiment of the present disclosure.
Figure 3B:
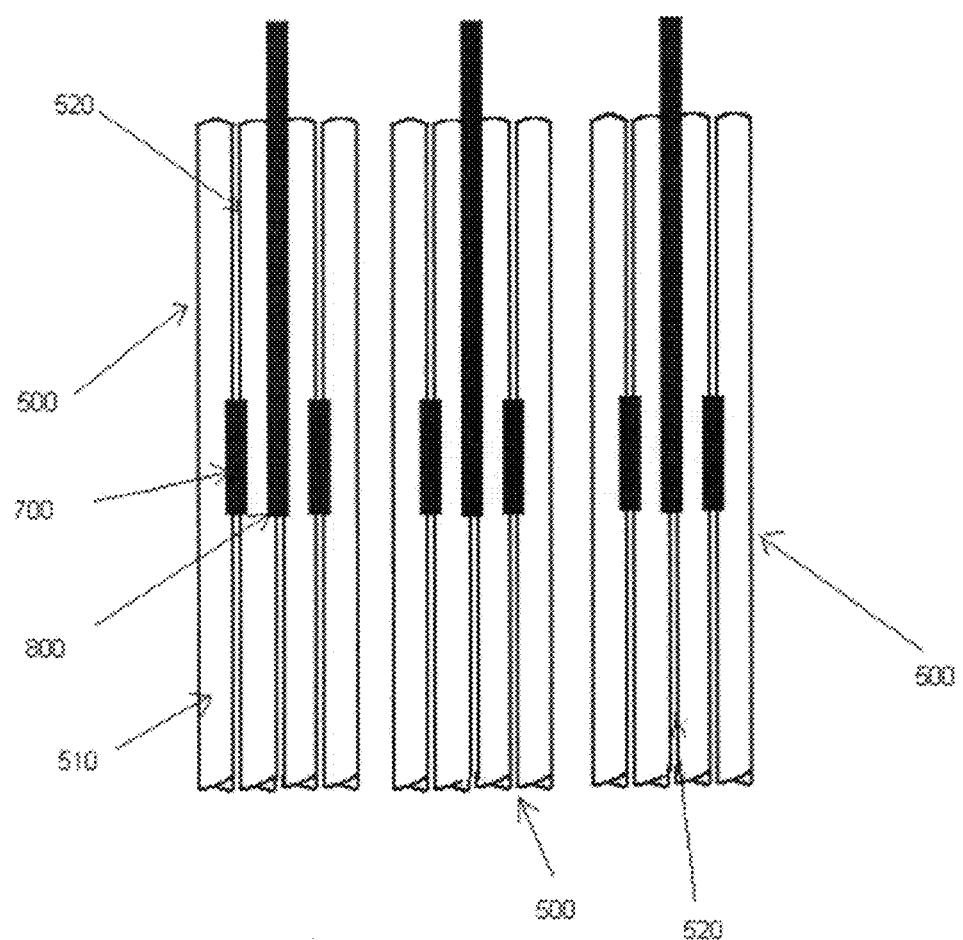

The solar receiver tube and support arrangements as illustrated in FIG. 2, will also be described in conjunction with FIGS. 3A and 3B, which, respectively, illustrate cross-sectional top and side views of the solar receiver tube and support arrangements, along axis Y-Y' and axis Z-Z', in accordance with an exemplary embodiment of the present disclosure. An arrangement of the solar receiver 300, (hereinafter referred to 'solar receiver arrangement 300') includes a plurality of receiver panels 500 arranged adjacent to one another. Each panel 500 has a plurality of tubes 510 substantially parallel and coupled tangentially to one another, and extends for fluidly connecting an inlet header of the panel 500 to an outlet header of the panel 500. The tubes 510 are primarily grouped in particular numbers that are predetermined as per the need and accordingly arranged. For example, as shown in FIGS. 3A and 3B, four tubes 510 are grouped to configure one panel 500. However, without departing from the scope of the present disclosure, any numbers of tubes, such as the tubes 510, may be grouped to configure the panel 500. The grouped tubes 510 are arranged adjacent to one another in such a manner that an outer surface of one tube 510 tangentially touched an outer surface of the adjacent tube 510, thereby forming a crotch portion 520 between a pair of tubes, such as the tubes 510. Such grouped and arranged tubes 510 are coupled together to form the panels 500, and accordingly the panels 500 are arranged to form the solar receiver arrangement 300 by utilizing a support structure 600.

The support structure 600 includes a plurality of tie members, such as tie members 700. The tie members 700 are utilized for coupling the plurality of tubes 510 arranged tangentially to one another, for configuring at least one receiver panel, such as the panels 500. At least one tie member 700 may be placed in the at least one crotch portion 520 of the pair of tubes 510 for being coupled therebetween, thereby coupling the pair of tubes 510 together. Generally, two crotch portions 520, one opposite to other, are formed while tangentially arranging the pair of tubes 510. Therefore in an example, as shown in FIGS. 3A and 3B, two tie members 700 may be utilized for coupling the two adjacent tubes 510, in which one tie member 700 is placed in each crotch portion 520, configured by tangentially orientating the pair of tubes 510. Alternatively, only tie member 700 may be utilized for coupling the pair of tubes 510 by coupling in only one crotch portion 520 of the pair of tubes 510. In a preferred embodiment of the present disclosure, the tie members 700 are coupled to the tubes 510 via welding, without departing the scope of other coupling methods or structures. Further, in one embodiment, the tie members 700 are substantially short-length rods that are welded in the crotch portion 520 between the pair of the tubes 510 for coupling thereto by substantially covering a relatively small region thereof for maximum direct solar rays' incident directly over the tubes 510, ensuring maximum exposure of the tubes 510 to heat flux. The support structure 600 or its associated components, such as the tie members 700 may be precluded from the area of the panel 500 where there is solar flux.

Coupling the desired number of grouped and arranged tubes 510 ensures the formation of a required number of the panels 500 that may be utilized for configuring the solar receiver arrangement 300. For configuration of the solar receiver arrangement 300, the support structure 600 further includes a plurality of panel support members, such as a panel support member 800, utilized for the assembly and grouping of the panels 500 for the formation of the solar receiver arrangement 300. Specifically, at least one panel support member 800 is coupled to the panel 500 selectively in the at least one crotch portion 520 between any of the pair of tubes 510. For example, the panel support members 800 may be coupled to the panel 500 selectively in the at least one crotch portion 520 lying substantially at a middle region of the panels 500. Alternatively, the support members 800 may be coupled to at any suitable region of the panel 500. Notably, where the panel support member 800 are coupled to the panel 500, there the tie members 700 are not coupled in the crotch portion 520 of any of the pair of tubes 510. In a preferred embodiment of the present disclosure, the panel support members 800 are coupled in the crotch portion 520 between the pair of tubes 510 via welding, without departing the scope of other couplings.

Further, the panels 500, each with the panel support members 800, are arranged adjacent to one another, in at least one of a spaced apart configuration and a closely associated configuration, for forming the solar receiver arrangement 300. In the spaced apart configuration, a predetermined distance is maintained between two panels 500. Further, in the closely associated configuration, the predetermined distance may be maintained at zero. Any of the configurations may be chosen as per the requirement and need. As so desired, arranged panels 500 are held up in an engaged position, which is obtained by at least one latching member 900. The latching member 900 is configured to detachably attach the plurality of panel support members 800 for engaging the plurality of receiver panels 500. The latching member 900 may extend from any supporting element of the solar receiver arrangement 300. In one embodiment, the latching member 900 may be a hanger rod extending from the solar receiver arrangement 300 structure's portion 310. Such a latching member 900 includes a channel member 910 configured at a distal end thereof. The channel member 910 of the latching member 900 receives the panel support member 800, which in one embodiment is the rod, (as shown in FIG. 2) to detachably attach thereto for engaging the plurality of receiver panels 500 to configure the solar receiver arrangement 300.

The solar receiver arrangement and support structure are advantageous in various scopes. The support member, particularly the tie members, are applicable for use in tying together the tubes for configuring the panel, wherein the tubes to be joined bear a tangential relationship to each other. Further, the support arrangement, particularly the panel support member, is capable of performing the function of providing support to the tube panels in conjunction with the latching member for forming the solar receiver arrangement. Furthermore, the solar receiver arrangement and a support structure are substantially more manageable in terms of assembly and maintenance, and ensure maximum exposure to heat flux, and reduce local stress development during connection thereof due to the involvement of a fewer number of components. The solar receiver arrangement and support structure may also be capable of being fabricated and assembled with relative ease. Furthermore, the solar receiver arrangement and support structure may also be economical to produce and to employ. Moreover, apart for the aforementioned advantages, such a construction method or sequence and the plant include various other advantages of today's plants and method.

The foregoing descriptions of specific embodiments of the present disclosure have been presented for purposes of illustration and description. They are not intended to be exhaustive or to limit the present disclosure to the precise forms disclosed, and clearly many modifications and variations are possible in light of the above description. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

REFERENCE NUMERAL LIST

1000 Solar power plant
100 solar tower assembly
200 Tower structure
300 Solar receiver arrangement
310 Solar receiver structure portion
400 Heliostat
500 Receiver panel, panel
510 Tubes
520 Crotch portion
600 Support structure
700 Tie members 800 Panel support member
900 Latching member
910 Channel member

What is claimed is:

1. A support structure for a solar receiver arrangement, the solar receiver arrangement including a plurality of tubes arranged to form at least one crotch portion between a pair of tubes, the support structure comprising:
   a plurality of tie members configured to tangentially couple the plurality of tubes to form at least one receiver panel, such that at least one tie member is coupled in the at least one crotch portion, and each of the plurality of tie members comprises a rod welded in and coupled to the at least one crotch portion permitting maximum direct solar rays incident directly over the plurality of tubes of the at least one receiver panel;
   a plurality of panel support members, at least one of said plurality of panel support members configured to couple to the at least one receiver panel in the at least one crotch portion, with each of the plurality of panel support members comprising a rod configured to be received in a channel of an at least one latching member; and
   the least one latching member extending downwardly from a point above a portion of the solar receiver arrangement configured to detachably attach the plurality of panel support members and to engage the at least one receiver panel.

2. The support structure as claimed in claim 1, wherein the plurality of tubes forms at least two opposite crotch portions between a pair of tubes, and at least one tie member is configured to be coupled in both of said at least two opposite crotch portions.

3. The support structure as claimed in claim 1, wherein each of the plurality of panel support members is configured to be coupled to at least one receiver panel in at least one crotch portion at a middle region of the at least one receiver panel.

4. The support structure as claimed in claim 1, wherein the rod of each of the plurality of panel support members comprises a longitudinally extending threaded rod configured to be received in the channel of the at least one latching member extending downwardly from the point above the portion of the solar receiver arrangement and engage the plurality of receiver panels.

5. A solar receiver arrangement comprising:
   a plurality of receiver panels arranged adjacent to one another, each receiver panel having a plurality of tubes coupled tangentially to one another, said plurality of tubes forming at least one crotch portion therebetween;
   a plurality of tie members coupling the plurality of tubes such that at least one tie member is coupled in said at least one crotch portion;
   a plurality of panel support members, at least one panel support member of said plurality of panel support members coupled to at least one of said plurality of receiver panels in said at least one crotch portion, with each of the plurality of panel support members comprising a rod configured to be received in a channel of at least one latching member extending downwardly from a point above a portion of the solar receiver arrangement to support the at least one of said plurality of receiver panels.

6. The solar receiver arrangement as claimed in claim 5, wherein the receiver panels of said plurality of receiver panels are arranged adjacent to one another, in at least one of a spaced apart configuration and a closely associated configuration.

7. The solar receiver arrangement as claimed in claim 5, further comprising:
   at least one latching member extending downwardly from the point above the portion of the solar receiver arrangement configured with the channel to detachably attach the rods of the plurality of panel support members to engage the plurality of receiver panels.

8. The solar receiver arrangement as claimed in claim 7, wherein the rod of each of the plurality of panel support members comprises a longitudinally extending threaded rod configured to be received in the channel of the at least one latching member extending downwardly from the point above the portion of the solar receiver arrangement to engage the plurality of receiver panels.

9. A solar receiver panel comprising:
   a plurality of tubes tangential to one another and forming at least one crotch portion;
   a plurality of tie members configured to couple the tangentially arranged plurality of tubes such that at least one tie member is coupled in said at least one crotch portion, with each of the plurality of tie members comprising a rod welded in and coupled to the at least one crotch portion permitting maximum direct solar rays incident directly over the plurality of tubes forming the solar receiver panel; and
   at least one panel support member coupled to the plurality of tubes in at least one crotch portion to be received in a channel of at least one latching member extending downwardly from a point above a portion of the solar receiver arrangement to support the solar receiver panel.

10. A method for making a solar receiver panel, the method comprising:
    arranging a plurality of tubes tangentially to one another and forming at least one crotch portion;
    welding a plurality of tie members to couple the tangentially arranged plurality of tubes such that at least one tie member is welded in at least one crotch portion between a pair of tubes to form the solar receiver panel; and
    welding at least one panel support member to the plurality of tubes in at least one crotch portion with the at least one panel support member comprising a rod configured to be received in a channel of an at least one latching member extending downwardly from a point above a portion of the solar receiver arrangement to support the solar receiver panel.

* * * * *